United States Patent
Brauer

(10) Patent No.: US 7,074,356 B2
(45) Date of Patent: Jul. 11, 2006

(54) USE OF PRE-SORTED PLASTIC MATERIAL WASTES AND PROCESS FOR PRODUCING A GRANULAR MATERIAL AS A FILTER FOR THE PURIFICATION OF SEWAGE

(75) Inventor: Christine Brauer, Hamburg (DE)

(73) Assignee: Brightwater Engineering Limited, Hertfordshire (GB)

( * ) Notice: Subject to any disclaimer, the term of this patent is extended or adjusted under 35 U.S.C. 154(b) by 485 days.

(21) Appl. No.: 09/960,269

(22) Filed: Sep. 20, 2001

(65) Prior Publication Data

US 2003/0057587 A1    Mar. 27, 2003

(51) Int. Cl.
| | |
|---|---|
| *B29B 9/02* | (2006.01) |
| *B29B 9/06* | (2006.01) |
| *C02F 3/10* | (2006.01) |
| *B01D 39/16* | (2006.01) |
| *B01D 39/04* | (2006.01) |

(52) U.S. Cl. .................. 264/140; 264/141; 264/920

(58) Field of Classification Search ............... 264/36.1, 264/36.15, 37.1, 140, 141, 918, 920; 428/903.3
See application file for complete search history.

(56) References Cited

U.S. PATENT DOCUMENTS

| | | | | |
|---|---|---|---|---|
| 4,006,283 A | * | 2/1977 | MacKenzie et al. | 525/387 |
| 4,379,525 A | * | 4/1983 | Nowicki et al. | 241/20 |
| 4,412,042 A | * | 10/1983 | Matsuura et al. | 525/260 |
| 4,656,197 A | | 4/1987 | Yoshimura et al. | 521/56 |
| 4,956,033 A | * | 9/1990 | Martin et al. | 156/94 |
| 5,170,911 A | * | 12/1992 | Della Riva | 222/105 |
| 5,783,066 A | * | 7/1998 | Aylmore | 210/150 |
| 6,127,434 A | * | 10/2000 | Triboulet et al. | 521/41 |

FOREIGN PATENT DOCUMENTS

| | | | |
|---|---|---|---|
| DE | 19702521 C1 | | 3/1998 |
| DE | 197 00 354 | * | 7/1998 |
| DE | 19716213 A1 | | 10/1998 |
| DE | 19932903 A1 | | 10/2000 |
| GB | 2 326 114 | * | 12/1998 |
| JP | 57030596 | | 2/1982 |
| JP | 6345890 | | 12/1994 |
| JP | 8-299977 | * | 11/1996 |
| JP | 9-47759 | * | 2/1997 |
| WO | WO9426086 | | 11/1994 |

* cited by examiner

*Primary Examiner*—Melvin Mayes
(74) *Attorney, Agent, or Firm*—Seed IP Law Group PLLC

(57) ABSTRACT

A granular material for use as a filter in the purification of sewage. The granular material is comprised of pre-sorted and cleaned plastic material wastes. A process for producing the same is provided.

10 Claims, No Drawings

USE OF PRE-SORTED PLASTIC MATERIAL WASTES AND PROCESS FOR PRODUCING A GRANULAR MATERIAL AS A FILTER FOR THE PURIFICATION OF SEWAGE

TECHNICAL FIELD

The invention concerns the ecologically meaningful use of pre-sorted plastic material wastes and a process for producing a granular material as a filter for the purification of sewage and waste water.

BACKGROUND

The use of plastic material wastes, in particular those which have been pre-sorted and/or purified, is known in the state of the art, as well as various processes for producing a granular material made up of a single kind of material, as a filter for the purification of sewage and waste water. As is known, large amounts of plastic material wastes, in particular also domestic packaging, are recycled in terms of the material involved. The Deutsche Gesellschaft fur Kunststoffrecycling GmbH, referred to for the sake of brevity as DKR, implemented a procedure for suitably splitting up those various plastic materials. There is a foil or sheet fraction, a plastic bottle fraction, an E PS fraction, a cup fraction and a mixed plastic material fraction. Residues are put to use by thermal processes, for example by the production of energy by incineration. Thus DSD (Duales System Deutschland) already represented in 1997 a utilisation quota of 86%, as is referred to in the newspaper 'DIE WELT' of 5th Feb. 1999. However the DSD-DKR system also presents itself as being more and more market and economy oriented. If at the present time there are still loss-making quotas of DM 500.00/mt for the processors which are certified in the DSD-sector, that will in fact change in the next few years.

Naturally large corporate groups with enormous levels of expenditure are in a position to satisfy the qualitative wishes of some limited customers including, inter alia, those abroad. Nonetheless the market for the DSD material still remains limited. The reasons are problems dealing with materials of a single kind in each case, certain odorous fragments and the difficulty of the technical specification which still remains the same.

There is therefore a need at the lowest possible level of expenditure to produce a simple and ecologically meaningful product, starting from a basic raw material which is continuously available and which, unlike the situation with tubes or flanges which can be produced from the DSD granular material, sets only low levels of demand in terms of quality.

DETAILED DESCRIPTION

WO 94/26086 also discloses plastic granular materials which are produced from polymer materials which are not homogeneously extruded by an extruder and are used in water treatment installations for the cleaning and purification of sewers or sewage and waste water. It will be appreciated that the initial plastic material products used in accordance with that particular process are relatively expensive, and for that reason the industrial use thereof, outside Great Britain, has hitherto not taken place on a greater scale.

As a countermove to these high-qualified plastic materials the invention seeks to afford a remedy insofar as it opens up a new purpose of use for plastic material wastes and in particular those which originate from the dual system in Germany and Europe.

The aim of the present invention is to provide a process based on those wastes for producing a granular material as a filter for the purification of sewage, which affords an inexpensive end product in a particularly simple and rapid fashion.

The process steps according to the invention are as follows:

a) Procuring and providing this plastic material waste, in particular that from the bottle fraction of the Duales System Deutschland DER GRÜNE PUNKT, b) cleaning and chopping that plastic material waste and then drying same, c) heating same at about 280° to the molten state, d) extruding same, in particular at degressive temperatures, by way of a screw or cascade extruder, in particular at a rotary speed of between 260 and 300 rpm, and a mass pressure of between 130 and 150 Kp/cm$^2$, and e) cooling the molten material and cutting and/or sieving off the granular material in the desired length.

Surprisingly, it has been found that in actual fact, pre-sorted plastic material waste, as occurs with DSD in the form of a waste product, can be used not oniy as a recycling product, but also a granular material produced therefrom can be used as a filter for the purification of sewage. That is a particularly ecological form of exploitation which affords an extremely inexpensive starting material. Hitherto the men skilled in the art have not thought of such a system which operates in a circulatory mode, on the basis of regularly available DSD granular materials, as apparently the principle according to the invention of 'purifying waste (sewage) with waste' involves a major inhibition.

Therefore in one aspect, the present invention provides a method of producing a material for use as a filter to purify sewage, comprising: (a) providing pre-sorted plastic material wastes comprising substantially polyethylene or polypropylene; (b) adding between about 0.01 and 5% by weight of a peroxide, with respect to the total weight of the plastic material, to the pre-sorted plastic material wastes; and (c) forming the plastic material wastes into granular material, wherein an addition of. More typically, the weight of the peroxide added is between 0.1 and 0.5% of the total weight of the plastic material. It is preferred that the peroxide added to the plastic material wastes be in ground form.

While in accordance with the invention a cascade extruder operates without peroxide, it is advantageous in terms of the process for a small amount of peroxide to be added for cross-linking purposes to the DSD base product in the screw extruder, giving a homogeneous end product. Advantageously, for that purpose, only between about 10 and 20 and in particular 15% by weight of the DSD plastic waste material is mixed with the peroxide additive, for example dicumyl peroxide at 40% in PB, or peroxide-bearing waste materials, in particular chopped or ground floor heating tubes, in order to achieve the largest possible surface area for the granular material, whereby the colonisation of micro-organisms is possible and the longevity of the granular material is increased.

The degressive temperature control in conjunction with the peroxide provides for a resistant surface area for the granular material, which is as large as possible and which permits micro-organism colonisation. The peroxide also affords the advantage that in this case, with the longevity in question, involves a system which after purification can in practice be used repeatedly.

A preferred embodiment of the operating procedure according to the invention is described in greater detail hereinafter:

preparing a mixture in a mixing silo:
  about 85% by weight of DSD material, cleaned and dried ground bottle material,
  about 15% by weight of PE compound (contains about 2% peroxide);
alternatively:
about 15% by weight of PE ground material from floor heating tubes (note: in the case of cascade extruders, no 15% by weight admixing is necessary)/(the term cascade extruders is used to denote two extruders which are connected together);
heating the extruder;
starting the extruder with adjustment of the heating zones (falling degressively from 270° C./melting of the introduced ground bottle material—200° C.) and of the cutting tools for regulating the granular material size;
starting degassing (in the case of cascade extruders double degassing possibly necessary);
addition of 1% black master batch (that is to say a color additive by way of a metering installation, color is actually not necessary but improves optical aspect/impression;
setting the screw rotary speed, individually according to the respective type of extruder, in most cases at 300 rpm;
a mass pressure of about 130 kg/cm$^2$ is correspondingly reached;
extruding the mixture by way of an extruder by way of a 400μ sieve;
extrusion through a 1.5 mm apertured plate. A man skilled n the art can envisage other sizes;
cooling the granular materials by way of a water bath;
cutting and sieving off the oversizes and undersizes of the granular materials;
  sucking off into a storage silo;
  bagging from the storage silo in for example 1200 kg bags; and
  setting down the bag on a wooden board.

The bottle fraction of the DSD was investigated on the basis of various samples, the results of which are set out hereinafter:

| Plastic material bottles | | |
|---|---|---|
| Specification | Purity | Impurities |
| Bottles ≦ 5 liters volume content (for example shampoo bottles, detergent bottles, domestic cleaners) | min 94% IL specification max 3% impurities max 3% other plastic material packagings | metal glass paper foreign materials such as rubber, textiles, wood, stones composite materials such as plastic material-aluminum (drinks cartons etc) non-packagings of plastic material (special agreements remain reserved) |

| 1st sample - regranular material from DSD bottle fraction (green-grey granular material) | | | |
|---|---|---|---|
| Analysis values | Test for | Test procedure | Test result |
| | PVC | RFA | <0.05% |
| | Polyamides | Formic acid extract/IR | Non-detectable |
| | Polystyrene, ABS, polycarbonate, plasticiser, wax etc | Chloroform extract/IR | 1.44% |
| | Fillers, glass fibers, inorganic accompanying materials | Ignition residue at 550° C. (DIN 53 568) | 0.92% |
| Comments | The chloroform extract predominantly comprises an aliphatic carboxylic acid ester. It was not possible to detect thermoplastic impurities such as polystyrene, ABS, polycarbonate etc. The extraction residue comprises a mixture of polyethylene (main component) and marked amounts of polypropylene. Impurities are not detectable IR-spectrometrically. | | |
| Summary | After consideration is given to the impurities determined in 5 there is a content of polyolefins (PE/PP) in sample A of ≧97%. | | |

| 2nd sample - ground material from DSD bottle fraction (from a further manufacturer) | | | |
|---|---|---|---|
| Analysis values | Test for | Test procedure | Test result |
| | PVC | RFA | <0.05% |
| | Polyamides | Formic acid extract/IR | Non-detectable |
| | Polystyrene, ABS, polycarbonate, plasticiser, wax etc | Chloroform extract/IR | 1.14% |
| | Fillers, glass fibers, inorganic accompanying materials | Ignition residue at 550° C. (DIN 53 568) | 1.03% |
| Comments | The chloroform extract predominantly comprises an aliphatic carboxylic acid ester. It was not possible to detect thermoplastic impurities such as polystyrene, ABS, polycarbonate etc. The extraction residue comprises a mixture of polyethylene (main component) and marked amounts of polypropylene. Impurities are not detectable IR-spectrometrically. | | |
| Summary | After consideration is given to the impurities determined in 5 there is a content of polyolefins (PE/PP) in sample A of ≧97%. | | |

The process according to the invention therefore shows that the plastic material used does not have to be sterile and new for each use and precisely not for use as a filter, but on the contrary the products described and claimed can be employed for that purpose.

Besides the described possibility of using in particular plastic material wastes from the bottle fraction, it is also possible to use mixed plastic materials.

If problems arise by virtue of fluctuations in density in the mixed plastic materials, such fluctuations in density can be compensated by the addition of fillers such as for example chalk so that the resulting granular material grains are always of the desired density and can be suspended in water.

The invention also includes the possibility of not only preparing the granular material as a filter substrate but also as a carrier for micro-organisms, by means of which then a fluid can be treated in the desired manner if the granular materials are colonised together with the micro-organisms for example in a water treatment apparatus.

The invention claimed is:

1. A method of producing a material for use as a filter to purify sewage, the method comprising:
   providing pre-sorted plastic material wastes comprising substantially polyethylene or polypropylene;
   adding between about 0.01% and 5% by weight of a solid peroxide, with respect to the total weight of the plastic material, to the pre-sorted plastic material wastes;
   crosslinking the pre-sorted plastic material wastes in the presence of the peroxide to provide a substantially homogeneous plastic material; and
   forming the substantially homogeneous plastic material into a granular material.

2. The method as set forth in claim 1 wherein the peroxide added to the plastic material wastes is in ground form.

3. The method of claim 1 wherein the peroxide is provided by peroxide-bearing waste.

4. The method of claim 1 wherein the peroxide is dicumyl peroxide.

5. The method of claim 1 wherein the step of crosslinking including heating a mixture of the pre-sorted plastic waste materials and the peroxide.

6. A method of producing a material for use as a filter to purify sewage, the method comprising:
   providing pre-sorted plastic material wastes comprising substantially polyethylene or polypropylene;
   adding between about 0.1% and 0.5% by weight of a solid peroxide, with respect to the total weight of the plastic material, to the pre-sorted plastic material wastes;
   crosslinking the pre-sorted plastic material wastes in the presence of the peroxide to provide a substantially homogeneous plastic material; and
   forming the substantially homogeneous plastic material into a granular material.

7. The method of claim 6 wherein the peroxide added to the plastic material wastes is in ground form.

8. The method of claim 6 wherein the peroxide is provided by peroxide-bearing waste.

9. The method of claim 6 wherein the peroxide is dicumyl peroxide.

10. The method of claim 6 wherein the step of crosslinking including heating a mixture of the pre-sorted plastic waste materials and the peroxide.

* * * * *